(12) United States Patent
Adler

(10) Patent No.: US 10,030,833 B2
(45) Date of Patent: Jul. 24, 2018

(54) MULTIMODE COLOR TUNABLE LIGHT SOURCE AND DAYLIGHTING SYSTEM

(71) Applicant: Helmar Adler, Danvers, MA (US)

(72) Inventor: Helmar Adler, Danvers, MA (US)

(73) Assignee: OSRAM SYLVANIA Inc., Wilmington, MA (US)

( * ) Notice: Subject to any disclaimer, the term of this patent is extended or adjusted under 35 U.S.C. 154(b) by 0 days.

(21) Appl. No.: 15/168,606

(22) Filed: May 31, 2016

(65) Prior Publication Data

US 2016/0273726 A1    Sep. 22, 2016

Related U.S. Application Data

(63) Continuation-in-part of application No. 13/152,872, filed on Jun. 3, 2011, now abandoned, and a
(Continued)

(51) Int. Cl.
| | |
|---|---|
| H05B 37/02 | (2006.01) |
| F21S 19/00 | (2006.01) |
| H05B 33/08 | (2006.01) |
| F21S 2/00 | (2016.01) |
| F21S 11/00 | (2006.01) |
| H04L 12/28 | (2006.01) |
| H04L 12/64 | (2006.01) |

(Continued)

(52) U.S. Cl.
CPC ........... *F21S 19/005* (2013.01); *F21S 2/00* (2013.01); *F21S 11/00* (2013.01); *H04L 12/2803* (2013.01); *H04L 12/6418* (2013.01); *H05B 33/086* (2013.01); *H05B 33/0854* (2013.01); *H05B 33/0872* (2013.01); *H05B 37/0218* (2013.01); *H05B 37/0227* (2013.01); *F21Y 2113/13* (2016.08); *F21Y 2115/10* (2016.08)

(58) Field of Classification Search
CPC . F21S 2/00; F21S 11/00; F21S 19/005; F21Y 2113/13; F21Y 2115/10; H04L 12/2803; H04L 12/6418; H05B 33/0854; H05B 33/086; H05B 33/0872; H05B 37/0218; H05B 37/227
See application file for complete search history.

(56) References Cited

U.S. PATENT DOCUMENTS

| | | | |
|---|---|---|---|
| 3,035,356 A | 5/1962 | Musser | |
| 3,257,074 A | 6/1966 | Graybill | |

(Continued)

FOREIGN PATENT DOCUMENTS

| | | |
|---|---|---|
| EP | 1610593 A2 | 12/2005 |
| EP | 2369087 A1 | 9/2011 |
| WO | 2010077993 A2 | 8/2010 |

OTHER PUBLICATIONS

X Zhang, T Muneer, J Kubie, A design guide for performance assessment of solar light-pipes, Lighting Res. Technol. 34, 2 (2002) pp. 149-169.

(Continued)

*Primary Examiner* — Alexander H Taningco
*Assistant Examiner* — Kurtis R Bahr
(74) *Attorney, Agent, or Firm* — Edward S. Podszus

(57) ABSTRACT

Described herein are day lighting systems that utilize a combination of at least one natural light source with at least one multimode artificial light source. Also disclosed are methods for designing and operating such systems.

22 Claims, 13 Drawing Sheets

Related U.S. Application Data continuation of application No. 13/536,147, filed on Jun. 28, 2012, now abandoned.

(51) Int. Cl.
*F21Y 115/10* (2016.01)
*F21Y 113/13* (2016.01)

(56) References Cited

U.S. PATENT DOCUMENTS

| | | | |
|---|---|---|---|
| 4,539,625 A * | 9/1985 | Bornstein | F21S 11/00 362/145 |
| 5,532,560 A * | 7/1996 | Element | E06B 9/32 160/176.1 P |
| 5,675,487 A | 10/1997 | Patterson | |
| 5,721,471 A * | 2/1998 | Begemann | H05B 37/02 250/214 AL |
| 5,861,717 A * | 1/1999 | Begemann | H05B 37/02 250/214 AL |
| 6,293,501 B1 * | 9/2001 | Kurland | B64G 1/281 244/164 |
| 6,411,046 B1 | 6/2002 | Muthu | |
| 7,845,823 B2 | 12/2010 | Mueller et al. | |
| 8,021,021 B2 | 9/2011 | Paolini | |
| 8,081,216 B2 * | 12/2011 | Cheung | H05B 37/0218 315/149 |
| 8,459,851 B2 * | 6/2013 | Wemmer | F21S 11/00 362/183 |
| 8,861,905 B2 * | 10/2014 | Moyer | F21S 11/00 385/25 |
| 8,937,444 B2 * | 1/2015 | Ogg | H05B 37/029 315/292 |
| 8,952,626 B2 * | 2/2015 | Huang | H05B 37/029 315/158 |
| 9,262,817 B2 * | 2/2016 | Mitsugi | G06T 7/00 |
| 2004/0105264 A1 | 6/2004 | Spero | |
| 2004/0169770 A1 | 9/2004 | Widener et al. | |
| 2004/0212321 A1 | 10/2004 | Lys et al. | |
| 2005/0151489 A1 | 7/2005 | Lys et al. | |
| 2006/0022214 A1 | 2/2006 | Morgan et al. | |
| 2006/0076908 A1 * | 4/2006 | Morgan | H05B 33/0842 315/312 |
| 2006/0085130 A1 * | 4/2006 | Belenkii | G01C 21/025 701/468 |
| 2007/0163732 A1 * | 7/2007 | Konstantin | A47H 23/06 160/237 |
| 2008/0204642 A1 | 8/2008 | Kobashi | |
| 2009/0213041 A1 | 8/2009 | Unger | |
| 2009/0222137 A1 * | 9/2009 | Berman | E06B 9/322 700/275 |
| 2010/0031952 A1 * | 2/2010 | Zavodny | F24J 2/07 126/573 |
| 2010/0206302 A1 | 8/2010 | Cheung et al. | |
| 2011/0044041 A1 | 2/2011 | Jaster | |
| 2011/0137757 A1 | 6/2011 | Paolini et al. | |
| 2011/0146662 A1 * | 6/2011 | Dehlsen | F24J 2/055 126/600 |
| 2011/0215725 A1 | 9/2011 | Paolini | |
| 2011/0242810 A1 * | 10/2011 | Lopez Querol | E04D 13/03 362/249.02 |
| 2012/0121125 A1 | 5/2012 | Dimov | |
| 2013/0002144 A1 | 1/2013 | Adler | |

OTHER PUBLICATIONS

Rikard Kuller et al., The impact of light and colour on psychological mood: a cross-cultural study of indoor work enviroments, Ergonomics, vol. 49, No. 14, Nov. 15, 2006, pp. 1496-1507.

Cardiff University, Dome simulates outdoors indoors, Professional Engineering.

P Sansoni, F Francini, D Fontani, L Mercatelli and D Jafrancesco, Indoor illumination by solar light collectors, Lighting Res. Technol. 2008; 40: pp. 323-332.

Reda, Ibrahim, "Solar Eclipse Monitoring for Solar Energy Applications Using the Solar and Moon Position Algorithms", NREL/TP-3B0-47681, Mar. 2010 (35 pages) (cited by Examiner in parent appln).

\* cited by examiner

MULTIMODE COLOR TUNABLE LIGHT SOURCE AND DAYLIGHTING SYSTEM

CROSS REFERENCE TO RELATED APPLICATIONS

This application is a continuation-in-part of U.S. patent application Ser. No. 13/152,872 filed Jun. 3, 2011, entitled "Multimode Color Tunable Light Source and Daylighting System" and a continuation of U.S. patent application Ser. No. 13/536,147 filed Jun. 28, 2012, the entire contents both of which is incorporated herein by reference

FIELD

The present disclosure relates to daylighting systems and methods that utilize one or more multimode color tunable light sources in combination with a source of natural light.

DETAILED DESCRIPTION

As used herein, the term "color" is used interchangeably with the term "spectrum." However, the term, "color" generally is used to refer to a property of radiation that is perceivable by an observer (though this usage is not intended to limit the scope of this term). Accordingly, the term "different colors" implies two different spectra with different wavelength components and/or bandwidths. In addition, "color" may be used to refer to white and non-white light.

For the purpose of this disclosure, the term "color temperature" refers to a particular color content or shade (reddish, bluish, etc.) of white light. The color temperature of a radiation sample is conventionally characterized according to the temperature in degrees Kelvin (K) of a black body radiator that radiates essentially the same spectrum as the radiation under examination. Daylight typically has a color temperature ranging from about 700 K to over 10,000 K, with lower color temperature corresponding to light having a more significant red component, and higher temperature corresponding to light having a more significant blue component. For reference, early morning light can exhibit a color temperature around 3,000 K, whereas overcast skies can exhibit a color temperature of around 10,000 K.

Reference will now be made in detail to exemplary embodiments of the disclosure, examples of which are illustrated in the accompanying drawings. Wherever possible, the same reference numbers will be used throughout the drawings to refer to the same or like parts.

The use and provision of daylight (daylighting) is becoming of increasing concern to architects and building engineers. Daylight can enhance the appearance of interior spaces, and can provide building occupants with social and psychological benefits. In addition, daylight can be used as a substitute or supplement to artificial lighting, which may reduce the overall energy usage of a building and impart substantial savings to building owners/occupants.

Traditionally, windows have been used as the primary mechanism for admitting daylight to the interior of a building. While windows can admit a great deal of light into an interior space, their usefulness for daylighting is limited by several factors. For example, windows can cause substantial solar heating of building interior spaces, particularly when used in large numbers. This can cause discomfort to building occupants, and may increase the load on air conditioning systems used to control the temperature of interior spaces in the building. Further, windows may not enable natural light to penetrate to all interior spaces of a building, particularly those interior spaces that are remote from the exterior walls of the building.

As a result, research has investigated other methods and devices for providing natural light to interior spaces. One product resulting from such research is the so-called "solar tube."

Figure 1:
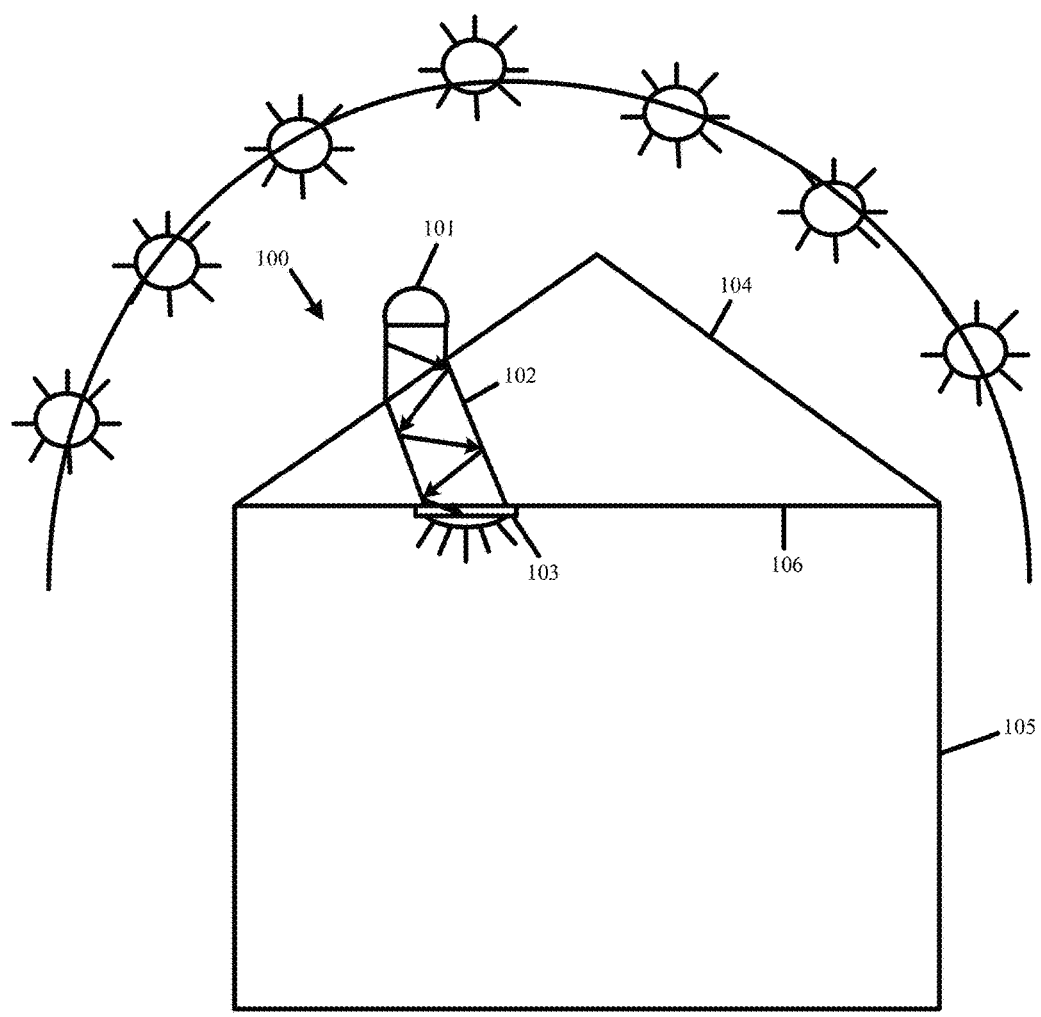
FIG. 1 depicts a lighting system according to the prior art.

FIG. 1 illustrates the structure of one type of solar tube, as installed in a building. As shown, solar tube 100 includes a dome 101, an optical conduit 102, and a diffuser 103. When installed, dome 101 is flush or above the roofline of a building 105, and serves to capture and redirect daylight (e.g., from the sun and/or the sky) into the optical conduit 102. The optical conduit 102 has one or more highly reflective interior surfaces (not labeled). As a result, captured daylight reflects one or multiple times off the interior surface(s) of the optical conduit, and is ultimately delivered to the diffuser 103.

While solar tubes such as the one depicted in FIG. 1 are capable of bringing significant daylight to the interior spaces of a building, they are not without limitations. Indeed, factors such as the position of the sun, the weather, and the clarity and diffuse radiance of the sky all impact the utility of solar tube. Many of these factors change over the course of a day, which means that the efficiency, light quality, and illumination capability of a solar tube can change dynamically. By way of example, solar-tubes such as the one depicted in FIG. 1 are generally ineffective for night-time illumination of the interior spaces of a building. Moreover, solar-tubes are often insufficient by themselves to illuminate darker areas.

One mechanism for addressing these limitations is to provide a combined lighting system, wherein one or more solar-tubes are utilized in conjunction with artificial lighting, such as incandescent or fluorescent lamps. The artificial lighting supplements the natural light provided by the solar-tube(s), and provides a mechanism for evening illumination. Such combined lighting systems can be operated with drivers that react to light intensity and change the intensity (brightness) of the artificial light sources, e.g., as a function of location in the building and the time of day.

While the addition of an artificial light source addresses some of the issues attendant to the use of solar-tubes for interior illumination, they result in the mixing of natural and artificial light from different sources, namely a solar-tube and a nearby fixture. Because artificial light sources typically have a single color and color temperature that is different from the color and color temperature of natural light, the combination of artificial light provided by such light sources with the natural light provided by a solar-tube can result in a perceptible and undesirable color difference. This color difference may be exacerbated during parts of the day, as the color temperature and intensity of the natural light provided by the solar-tube changes dynamically, e.g., with the position of the sun.

Because typical combined lighting systems utilize artificial lighting that has a fixed color and color temperature, such systems are generally incapable of addressing the aforementioned color difference, even if they are equipped with drivers that adjust the intensity of the artificial lighting. Moreover, such systems do not provide the capability to override the color and/or temperature of the natural light provided by a solar-tube when undesirable conditions exist, to supplement the spectrum and/or color of light provided by the solar-tube, and/or simulate desirable lighting conditions (e.g., producing a "sunny day" interior lighting profile, even when it is raining outside the building).

Accordingly, one aspect of the present disclosure relates to lighting systems that combine a source of natural light, such as a solar tube, with at least one artificial light source that is capable of producing light of varying color and/or color temperature.

Figure 2A:
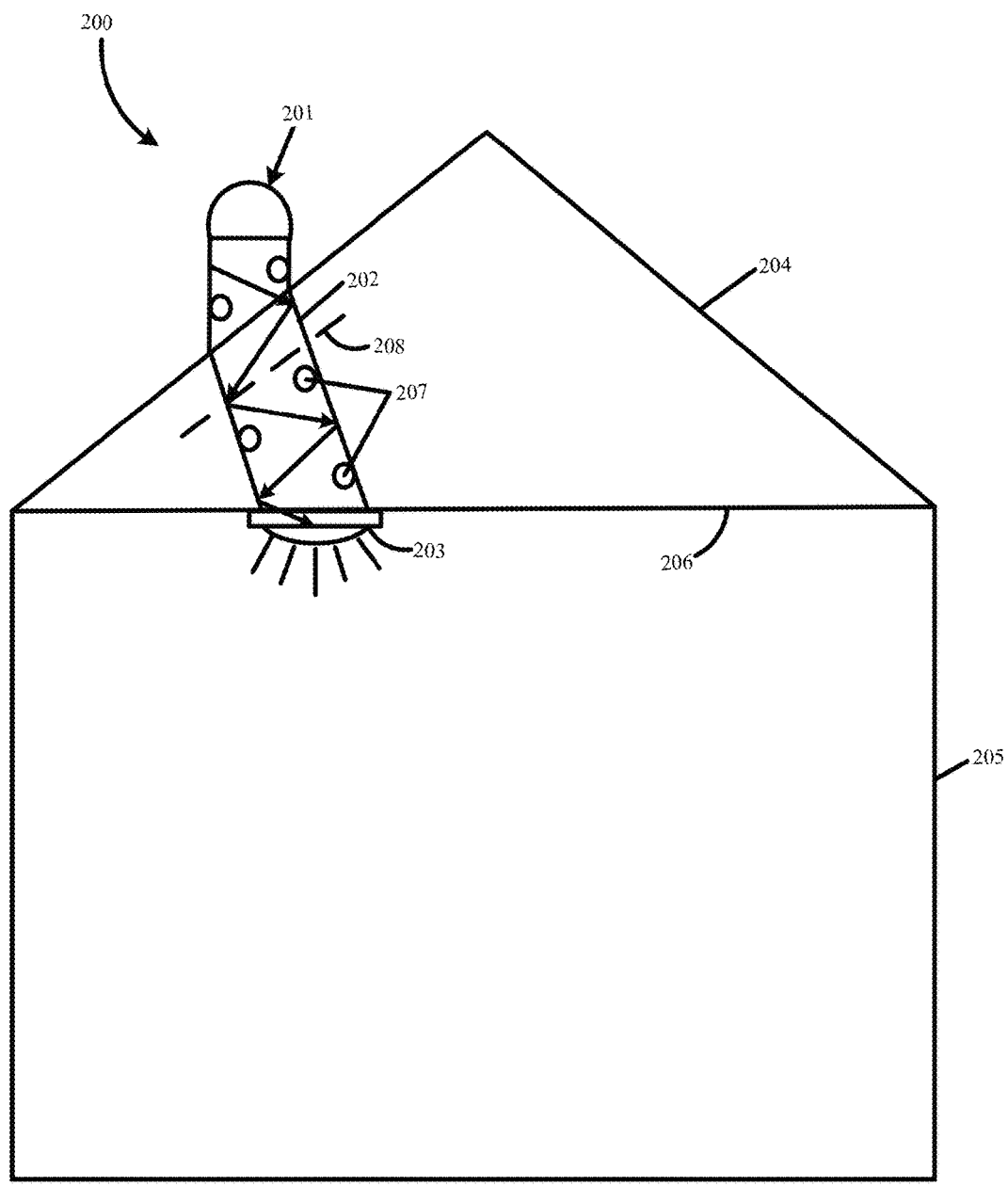
FIGS. 2A-2D depict various non-limiting embodiments of a lighting system in accordance with the present disclosure.

FIG. 2A illustrates one example of a lighting system 200 in accordance with the present disclosure. As shown, the lighting system 200 includes a solar-tube installed through the roofline 204 of a building 205. The solar-tube includes an inlet for capturing natural light, in this case dome 201. Dome 201 captures natural light, e.g., from the sun and/sky, and conveys it to an optical conduit 202. Similar to a traditional solar-tube, the optical conduit 202 includes highly reflective interior surfaces, which allow it to efficiently convey the captured natural light to a diffuser 203.

While the lighting system 200 is shown as including a dome 201 for capturing light, it should be understood that an inlet having any structure or mechanism for capturing natural light may be used. Non-limiting examples of such inlets include windows, mirror systems, solar concentrators, lenses, domes or a combination thereof.

While the optical conduit 202 is depicted in FIG. 2 as being angled relative to the outlet of the dome 201 and the inlet of the diffuser 203, one of ordinary skill will understand that this configuration is exemplary only and that the optical conduit 202 can be of any configuration suitable for delivering sunlight to the diffuser 203. For example, the optical conduit 202 may be straight, curvilinear, angled, or a combination thereof. The optical conduit 202 may also be configured in the form of a window, a skylight, or a combination thereof. In such instances, the optical conduit 202 may be of any suitable shape or configuration, e.g., quadrilateral (square, rectangular, trapezoidal, etc.), triangular, oblong, etc. In some embodiments, the optical conduit 202 is configured to convey the captured natural light to diffuser 203 with less than about 1% loss, such as less than about 0.5% loss, or even less than about 0.1% loss. Moreover, the solar tube may be configured to utilize one (as shown) or more than one (e.g., 2, 3, 4, etc.) optical conduits for each dome 201 and diffuser 203.

The diffuser 203 receives sunlight from the optical conduit 202, and distributes it into the interior of the building 205. In general, the diffuser 203 is configured to provide a desired distribution of natural light within an illuminated space. For example, the diffuser 203 may be configured as a convex dome, so as to provide even or substantially even distribution of the natural light received from the optical conduit 202. However, the shape and configuration of diffuser 203 may be altered to achieve a wide variety of optical distributions and/or effects. Moreover, while the diffuser 203 is shown in FIG. 2A mounted below the ceiling 206 of an interior space of the building 205, it should be understood that the diffuser 203 can be mounted in any manner, and positioned anywhere that delivery of natural light captured by the dome 201 is desired.

In addition to the aforementioned components, the lighting systems described herein can include at least one artificial light source 207. As non-limiting examples of suitable artificial light sources that may be used in accordance with the present disclosure, mention is made of multimode artificial light sources, and multimode artificial light sources in combinations with single mode artificial light sources.

As used herein, the term "multimode artificial light source" refers to any of a variety of radiation sources having at least two selectable colors and/or color temperatures. Such sources include, but are not limited to LED-based sources as defined below, incandescent sources (filament lamps, halogen lamps) with multiple selectable colors and/or color temperatures, fluorescent sources with multiple selectable colors and/or color temperatures (e.g., fluorescent lamps with two or more color temperatures), and high intensity discharge sources (e.g., sodium, mercury, and metal halide lamps) with multiple selectable colors and/or color temperatures. In some embodiments, the multimode light sources used herein are capable of exhibiting a wide range of colors and color temperatures, such as the colors in the red, green, blue (RGB) gamut and/or the red, green, blue, and yellow (RGBY) gamut.

As used herein, the terms, "light emitting diode" and "LED" are used interchangeably, and refer to any light emitting diode or other type of carrier injection/junction-based system that is capable of generating radiation in response to an electrical signal. Thus, the term LED includes but is not limited to various semiconductor-based structures that emit light in response to current, light emitting polymers, light emitting stripes, electro-luminescent strips, and the like.

In particular, the term LED refers to light emitting diodes of all types (including semi-conductor and organic light emitting diodes), and which may be configured to generate light in all or various portions of one or more of the visible, ultraviolet, and UV spectrum. Non-limiting examples of suitable LEDS that may be used include various types of infrared LEDS, ultraviolet LEDS, red LEDS, green LEDS, blue LEDS, yellow LEDS, amber LEDS, orange LEDS, and white LEDS. Such LEDS may be configured to emit light over a broad spectrum (e.g., the entire visible light spectrum) or a narrow spectrum.

The LED light sources used in the present disclosure may be formed by one or a plurality of individual LEDS. For example, the LED light source may be configured to include a number of individual LEDS that emit different spectra but which, collectively, emit light that is of a desired color (e.g., white, red, blue, green, yellow, orange, amber, etc.) and/or color temperature. An LED may also be associated with one or more phosphors that are an integral part of the LED.

In some embodiments, the artificial light source 207 is a multimode light source that includes at least one red (R), green (G) and blue (B) LED, and optionally at least one yellow (Y) LED. The R, G, B, and optionally Y LEDS each emit light in individual regions of the visible spectrum but, collectively, enable the artificial light sources 207 to emit light of any color, including any or a subset of colors in the RGB and/or RGBY gamut. Alternatively or additionally, the lighting systems of the present disclosure may make use of so-called color tunable LEDS, i.e., individual LEDs with adjustable color temperature and optionally adjustable intensity. As a non-limiting example of such color tunable LEDS, mention is made of phosphor converting LEDS.

The multimode artificial light sources of the present disclosure may be supplemented with single mode artificial light sources, e.g., to increase intensity and/or color reproduction over a desired range of the spectrum. As used herein, the term, "single mode artificial light source" refers to a wide range of light sources that exhibit a single color and color temperature. Such sources include, but are not limited to, conventional incandescent, fluorescent, and high intensity discharge sources (e.g., lamps), as well as single mode LED sources (e.g., high intensity white LEDS that do not have an adjustable or selectable color and color temperature).

In some embodiments, the lighting systems described herein utilize a combination of multimode LED light sources with fluorescent lamps. For example, the multimode LED light sources described above can be combined with single mode fluorescent lamps, multimode fluorescent lamps, and/or multiple single mode fluorescent lamps that have different color temperatures. In these embodiments, the fluorescent lamps can be dimmed/driven to provide light of a desired intensity, while the LED sources are driven to supply additional color emphasis/shift.

The single mode and multimode artificial sources may be capable of emitting light over a wide range of intensity (brightness) values. In some embodiments, the single mode sources and multimode sources used in the lighting systems described herein may individually or collectively emit light at an intensity of up to about 25,000 lux or more, where 1 lux=1 lumen per square meter. For example, such sources may individually or collectively emit light at an intensity ranging from greater than 0 to about 25,000 lux, such as about 1000 to about 20,000 lux, about 2500 to about 15000 lux, about 5000 to about 12500 lux, or even from about 8000 to about 12000 lux. In some the artificial light sources used in the present disclosure exhibit an intensity approximating that of natural light supplied by at least one solar-tube. In additional embodiments, the intensity of the single and multimode artificial light sources can be actively changed, e.g., via dimming.

In some embodiments, at least one of the artificial light sources described herein is installed within at least one component of a solar-tube. For example, and as shown in FIG. 2A, artificial light sources 207 may be installed periodically along the interior of the optical conduit 202. Of course, the positioning of the artificial light sources 207 in FIG. 2 is exemplary only, and such sources may be positioned at any suitable location within the solar tube, including within the dome 201 and the diffuser 203. Moreover, if multiple artificial light sources 207 are used, they may be arranged in any manner within the solar-tube. For example, the artificial light sources 207 may be arranged in a geometric (circular, triangular, square, rectangular, etc.) or irregular shape about a circumference of an interior of any of the dome 201, the optical conduit 202, and/or the diffuser 203. Alternatively or additionally, the artificial light sources 207 may be disposed in a random, patterned, and/or non-random, non-patterned fashion.

In some embodiments, the artificial light sources are disposed internally or externally of a solar-tube, and in such a manner that light emitted from the artificial light sources mixes with the natural light supplied by the solar-tube. This concept is illustrated generally in FIG. 2C, wherein the artificial light source 207 (in this case a color tunable LED source) is disposed adjacent to a source of daylight, e.g., a solar tube containing a dome 201, an optical conduit 202, and a diffuser 203. As shown, light from the artificial light source 207 and natural light supplied by the source of daylight mix in a mixing chamber 2150 prior to being emitted into an illuminated space, e.g., an interior space of a building (not shown).

By mixing light supplied by the artificial and natural light sources in this way, light from all sources is mixed (e.g., in a component of the solar-tube itself) prior to leaving a common outlet, such as a diffuser 203. This can give the impression that all of the light radiating from the outlet originated from a single source. It can also eliminate or address the perceptible color difference problem discussed above.

As described later, some embodiments of the present disclosure utilize artificial light sources that are mounted outside of the solar-tube and any mixing chamber. While such configurations may forego the "single source" benefit described above, they can provide other useful features and/or design flexibility.

The lighting systems of the present disclosure may also include one or more shutters 208, which can operate to control the intensity of the natural light admitted by the solar-tube. Shutter 208 may be manually or electromechanically actuated, thereby permitting manual, electronic, and automatic control over the intensity of the natural light emitted by the solar tube. In some embodiments, the shutter 208 is electromechanically actuated, and is responsive to control signals emitted by a control unit that may also be included in the lighting system, as described below.

Shutter 208 can be configured to alter the intensity of the natural light admitted by a solar tube by preventing all or a portion of the natural light from passing to the diffuser 203. In some embodiments, shutter 208 can block up to about 50%, such as up to about 75%, or even up to about 99% of the natural light captured by the dome 201 from entering a space to be illuminated. Shutter 208 may also include fine motor control, allowing for blocking of light in small (e.g., 1%, 5%, etc.) increments within any of the foregoing ranges.

In conjunction with other aspects of the present disclosure, the shutter 208 can assist the lighting systems described herein to "override" or supplement the natural light captured by dome 201, e.g., by limiting the contribution of the natural light to the overall light supplied by the lighting system as described below.

When the lighting systems described herein are installed in a location that includes at least one window, they may further include a manually or automatically actuated window shutter. This concept is reflected in FIGS. 2B and 2D, wherein a daylight sensor 209 (later described) is mounted in window 213. Window shutter 214 is mounted in window 213, and serves to control the amount and intensity of natural light entering the building through the window 213, e.g., in response to control signals transmitted from a control unit (later described).

Figure 2B:
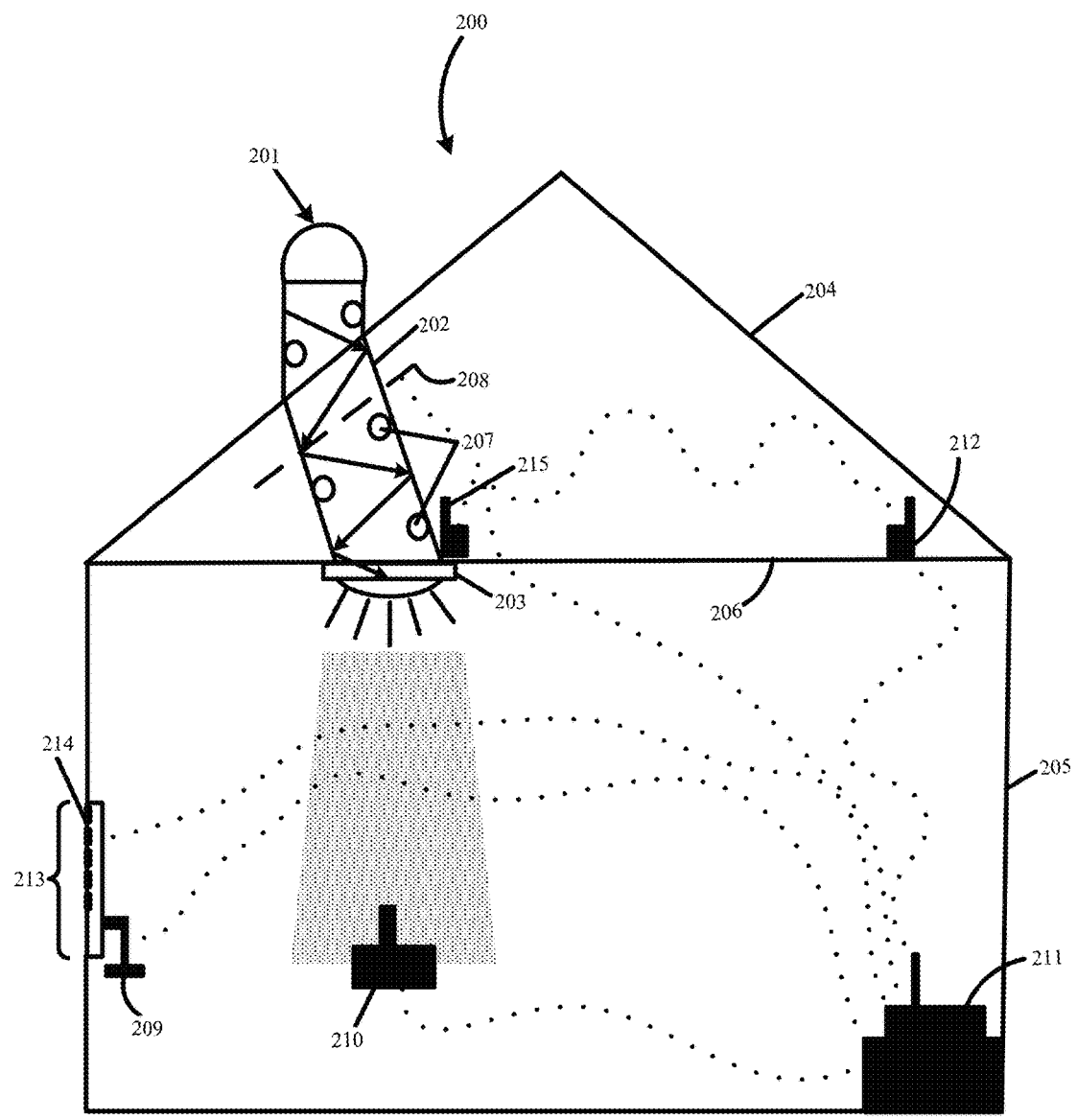
Figure 2C:
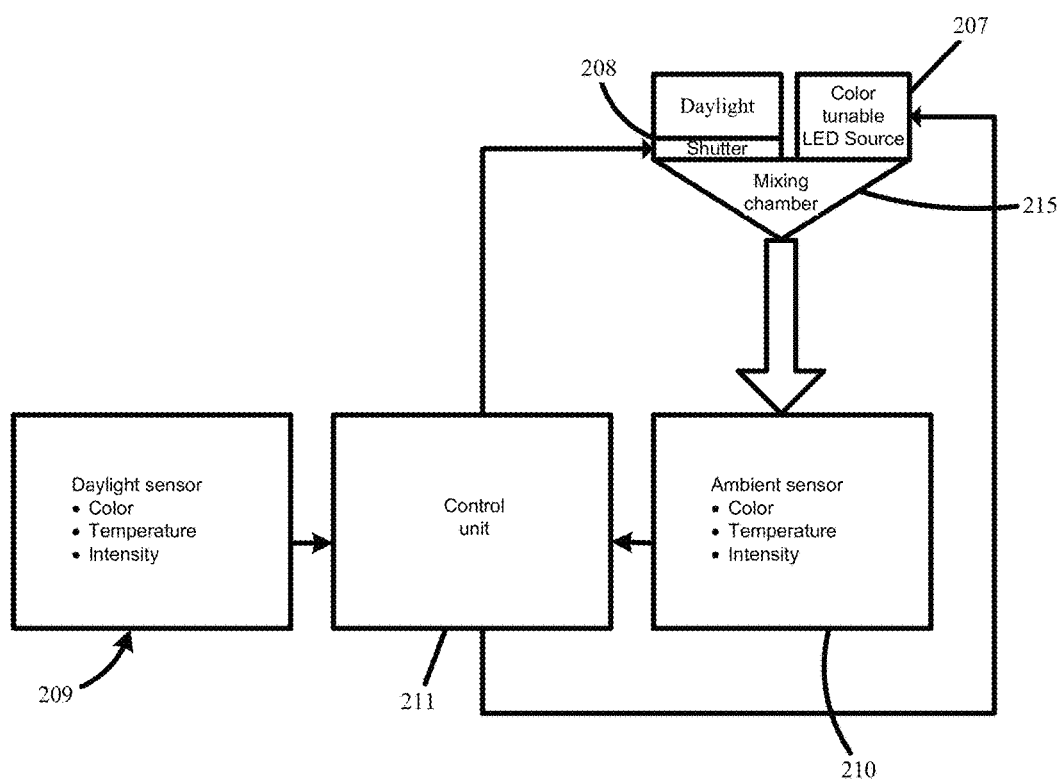
Figure 2C:
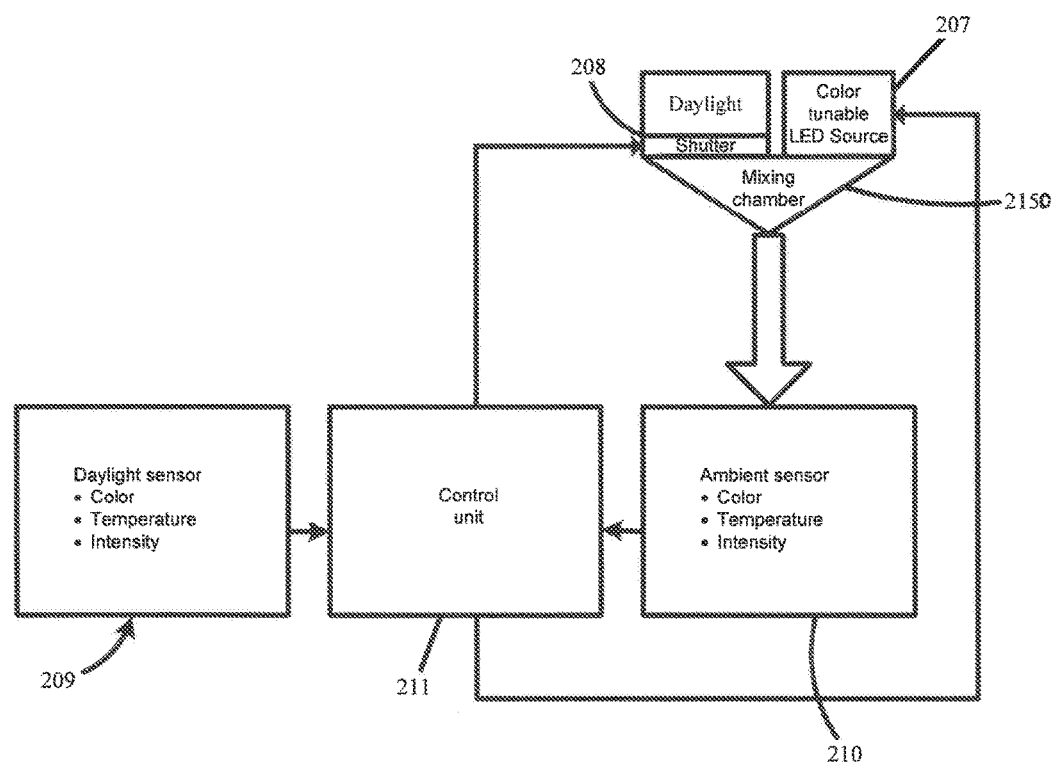

As further shown in FIG. 2B, the lighting systems described herein may include a control unit 211 that is in communication with the artificial light sources 207 and/or the shutter 208. In operation, the control unit 211 outputs control signals to the artificial light sources 207 and, optionally, the shutter 208. Based on the content of those control signals, the artificial light sources 207 emit light of a desired color, color temperature and, optionally, intensity. In addition, the shutter 208 actuates to adjust the intensity of the natural light provided by the solar tube. In this way, control unit 211 provides "instructions" to the shutter 208 and the artificial light sources 207, so as to achieve a desired lighting profile.

As used herein, the term "lighting profile" refers to the spectral characteristics (color, temperature, intensity, combinations thereof, and the like) of light provided by a light source or system. Lighting profiles may be natural (e.g., recorded or measured from a natural environment such as the outdoors), or synthetic (e.g., manually developed, or measured from an unnatural source such as a photograph). Data making up a lighting profile may be generated from active and optionally real-time data measurements of a natural environment, manual inputs, the measurement of a sample of a lighting environment (e.g., a photograph, a video image, etc.), or a combination thereof. For example, a "natural" lighting profile may be generated by measuring or recording desirable natural light conditions with a daylight sensor, such as the lighting conditions encountered on a clear sunny day, or at a famous location such as a popular beach. On the other hand, "artificial" lighting profiles may be manually created, determined by a lighting algorithm, or conducting a spectral analysis of a sample of a lighting environment, such as a photograph.

The control unit 211 may include a memory that can, for example, store one or more lighting profiles in machine readable format. In this way, the control units described herein allow for the automatic or manual selection of desirable lighting profiles that can supplement or override the natural light supplied by the solar-tube or another source of natural light.

The control unit 211 may further include a processor. The processor can operate to analyze and interpret environmental signals received from environmental sensors, such as the daylight sensor(s) 209 and ambient sensor(s) 210 (later described). Based on that analysis, the control unit can output control signals to the artificial light sources 207 and/or the shutter 208. Such control signals can be in any desired format, including but not limited to the DMX and DALI protocols commonly used in lighting systems.

As mentioned above and as illustrated in FIG. 2B, the lighting systems described herein can further include at least one environmental sensor, such as a daylight sensor 209. The daylight sensor 209 may be placed at any desired location where monitoring of the color characteristics of natural light is desired. As shown in FIG. 2B, for example, the daylight sensor 209 may be placed in window of a building, where it can detect and monitor the color of natural light from the viewing angle of that window. Alternatively or additionally, on or more environmental sensors may be placed at other locations, such on the roof or exterior wall of a building in which the lighting system is located, and/or another building. Likewise, one or more environmental sensors may be placed in proximity to the building housing the lighting system, e.g., in a courtyard, an entryway, etc.

In operation, the daylight sensor 209 can monitor spectral characteristics of an external environment (e.g., the outdoors), and transmit one or more environmental signals to the control unit 211 for analysis and interpretation. In the non-limiting examples in FIGS. 2B and 2D, for example, the daylight sensor 209 may operate to monitor color characteristics (e.g., wavelength (color), color temperature, and/or intensity) present in an outdoor environment.

Figure 2D:
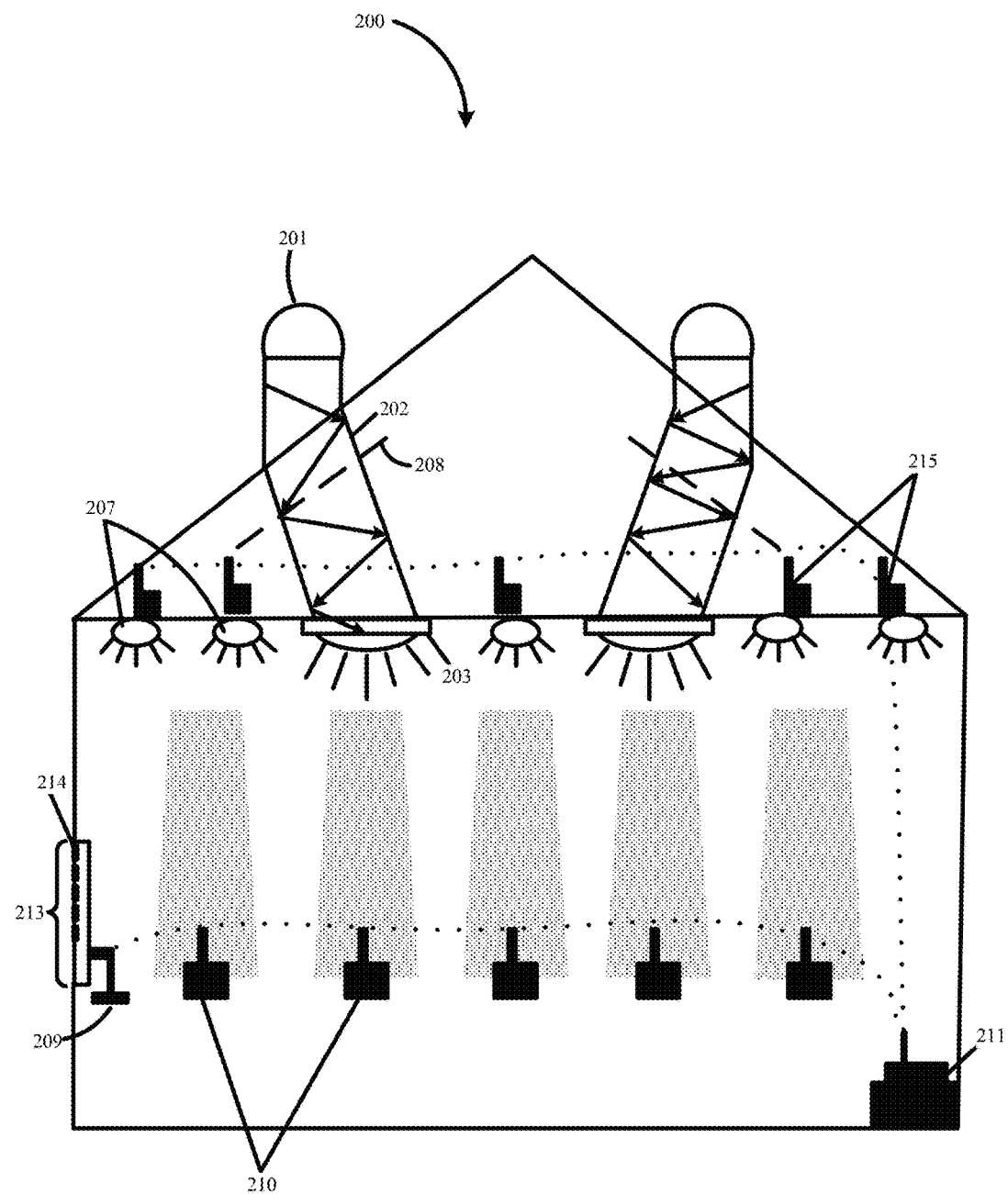

In some embodiments, multiple daylight sensors are used and are placed at different locations throughout a building. In this regard, it is noted that FIGS. 2B and 2D are illustrated for the sake of example as including a daylight sensor 209 that is in the form of a single window sensor that looks outward from window 213. As such, daylight sensor 209 in these FIGS. may be understood as having a limited view of the environment outside of building 205. For example, if window 213 faces east, daylight sensor may have a view of the environment east of building 205. It may therefore be understood that the daylight sensor 205 may be capable of measuring the spectral characteristics of light in the outdoor environment east of building 205, but may be unable to provide information regarding the spectral characteristics of light at other points (e.g., North, South, and West) of building 205.

To address this issue, the systems of the present disclosure may include multiple daylight sensors. Such sensors may be positioned such that information about the exterior lighting conditions at several points around building 205 may be gathered. For example, one or more daylight sensors may be placed such that lighting conditions north, south, east, and/or west of building 205 may be measured. In this way, the daylight sensors may identify and/or record variations in lighting conditions that may be present around a building in which they are installed. This may be accomplished, for example, by placing an environmental sensor such as daylight sensor 209 in windows that facing north, south, east, and or west from building 205.

Alternatively or additionally, the systems of the present disclosure may utilize one or more all sky cameras as an environmental sensor. As used herein, the term "all sky camera" means an optical sensor (e.g., a video camera) that can provide a horizon to horizon view of about 180°, and an azimuthal view of about 360°. Non-limiting examples of suitable all sky cameras include the ALLSKY340 camera produced by SBIG Astronomical Instruments, the StarShoot AllSky Camera produced by ORION Telescopes and Binoculars, the All Sky Cam produced by MOONGLOW TECHNOLOGIES, and the BLK-IPS102M camera produced by DIGIOP. Such cameras may include fisheye optics, such as a fisheye lens. The use of an all sky camera in connection with the systems described herein is described later in connection with FIGS. 5-8.

In any case, each environmental (daylight) sensor may operate, for example, to monitor at least one of the intensity and color characteristics of daylight at its respective location, and to generate appropriate environmental signals for transmission to control unit 211. Based on the information contained in the environmental signals produced by the daylight sensor 209, control unit 211 outputs control signals to the artificial light sources 207 (and/or shutter 208), and alters the color and intensity of the light produced by the artificial light sources 207 to account for undesirable characteristics in the natural light. In some embodiments, the color and/or intensity of the light produced by the artificial light sources 207 is adjusted by control unit 211 so as to substantially mimic or supplement the color and/or intensity of natural light. In cases where the artificial light supplements the natural light, control unit 211 may drive the artificial light sources 207 to it may "fill in" or override gaps and/or undesirable variations in the spectrum of the natural light so as to achieve light of desired quality, color, and/or spectral characteristics.

Figure 3A:
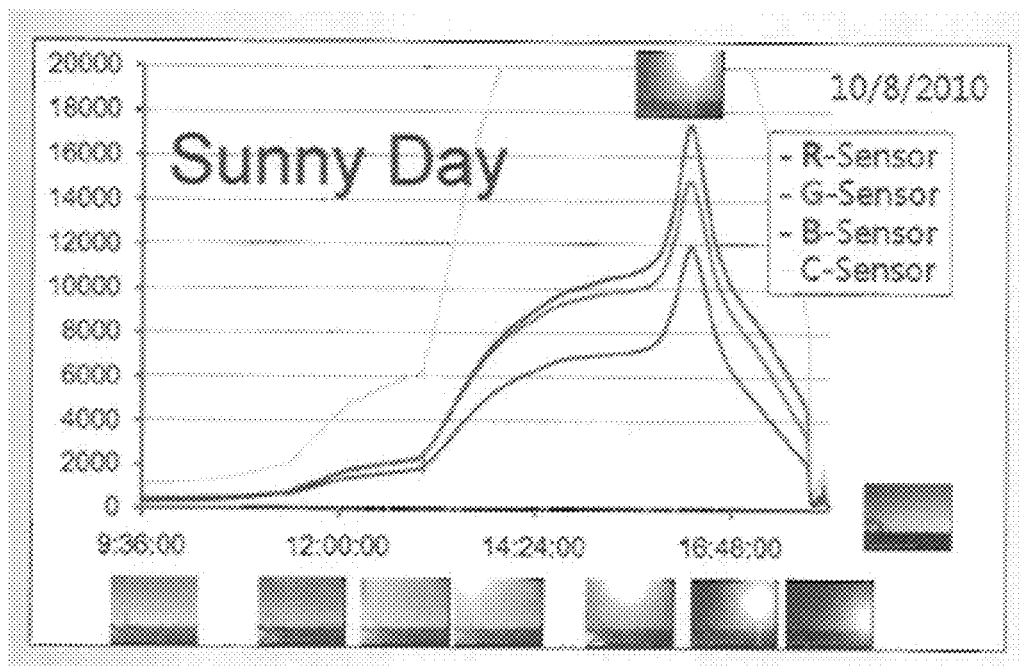
FIGS. 3A and 3B provide exemplary red, green, blue, and clear sensor data measured by at least one daylight sensor during a sunny (FIG. 3A) and cloudy (FIG. 3B) day.
Figure 3B:
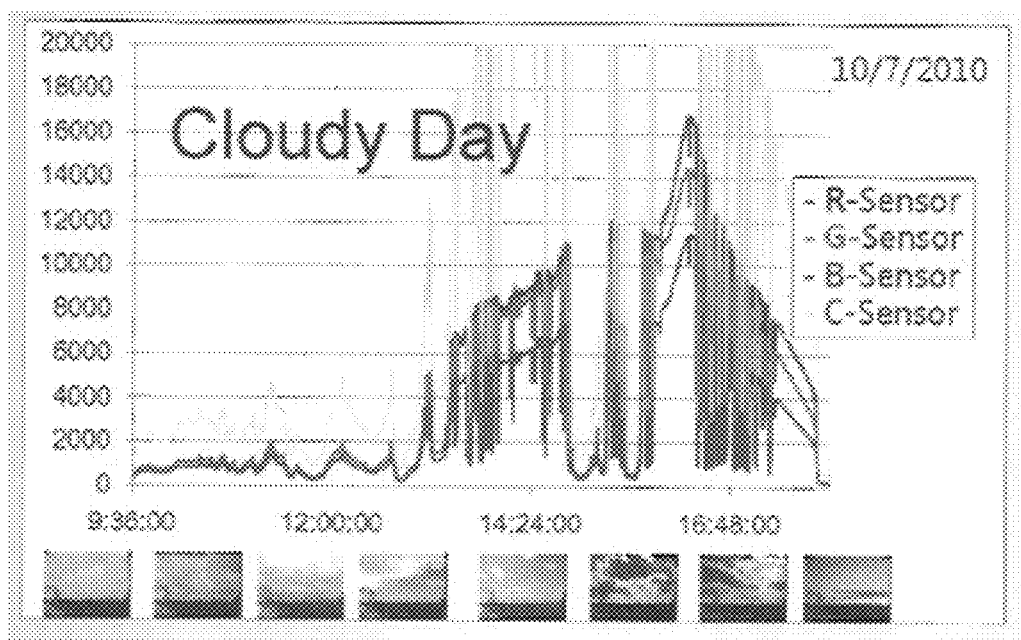

To illustrate this concept, reference is made to FIGS. 3A and 3B, which plot Red (R), Green (G), Blue (B) and clear (C) light intensity vs. time of day as measured by a daylight sensor during a sunny (FIG. 3A) and a cloudy (FIG. 3B) day. As shown in FIG. 3B, the RGBC data corresponding to a cloudy day can exhibit significant and seemingly random variation, as compared with the RGBC data corresponding to a sunny day. During the cloudy day, the natural light supplied by a solar tube would be in accordance with the data shown in FIG. 3B, which could lead to undesirable lighting conditions in an interior space.

In some embodiments of the present disclosure, the control unit 211 of the present disclosure can address this undesirable variability by comparing the data acquired by a daylight sensor to one or more lighting profiles. Based on this comparison, control unit 211 can output control signals that cause artificial lighting units to compensate for the undesirable variability in the monitored natural light. Using FIGS. 3A and 3B as an example, the control until 211 can perform a comparison of the RGBC sensor data measured during the cloudy day (FIG. 3B) with the desirable RGBC sensor data measured during a sunny day (FIG. 3A). Based on this comparison, the control unit 211 can instruct the artificial lighting units 207 to output light of a color and intensity sufficient to account for the variability in the rainy day RGBC data.

For example, if the RGBC data showed that relatively little blue light was emitted during a cloudy day, relative to a sunny day, the control unit 211 can instruct the artificial lighting units 207 to emit blue light of a corresponding color (wavelength) and intensity to "normalize" the cloudy day RGBC data to the sunny day RGBC data. In this way, an artificial light source as described above can be driven by a local sensor, thus allowing dynamic changes of the lighting conditions supplied by the lighting systems described herein.

As is understood in the art, the data provided by an environmental sensor such as a daylight sensor does not always correlate to the emitted color and intensity level of an artificial light source, such as an LED source. Thus, for example, if the environmental signals produced by daylight sensor 209 provide RGB and intensity sensor data to the control unit 211, a transformation of such data into RGB and intensity levels coinciding with the artificial light sources 207 may be necessary. Accordingly, in instances where LED sources are used in the artificial light sources 207, the control unit 211 can use an appropriate algorithm to transform the sensor data into the necessary LED color and intensity values needed to achieve a desired lighting profile.

The control unit 211 can regulate the light output of artificial light sources 207, the operation of shutter 208, and the operation of window shutter 213 (when used), through a wired or wireless connection. For example, the control unit 211 may communicate wirelessly with receivers 215 on the artificial light sources 207, shutter 208, and window shutter 213, either directly or through one or more wireless repeaters 212. Such wireless communication may occur using the 802.11 wireless standard, the 802.15.4 wireless standard, or another suitable wireless communication protocol.

In some embodiments, each artificial light source 207 is individually addressable by the control unit 211. As a result, the control unit 211 can control the output of each artificial light source 207 individually, even when a large number of artificial light sources are employed. Control unit 211 may therefore alter the output of artificial light sources installed in one location independently of artificial light sources installed at another location.

In addition to the daylight (environmental) sensor(s) 209, the lighting systems of the present disclosure may further include at least one ambient light sensor 210. Like the daylight sensor 209, the ambient sensor 210 functions to monitor color and other environmental characteristics, and to transmit environmental signals to control unit 211. However, instead of monitoring an external environment, the ambient sensor 210 is configured to monitor the lighting conditions (e.g., color, color temperature, intensity, etc.) of an area illuminated by the lighting systems described herein, and output environmental signals containing that information to the control unit 211. Those environmental signals can be used by the control system 211 to fine tune the output of the artificial light sources 207, e.g., by comparing the color and intensity characteristics of light outputted by the lighting system against a lighting profile stored in the memory of the control unit 211.

Ambient sensors 210 can also permit more flexible positioning of the artificial light sources 207. For example, the artificial light sources may be mounted external to a solar tube, and without the use of a previously described mixing chamber 2150. In some embodiments, the artificial light sources are placed a significant distance from the solar tube, such as from greater than 0 to about 100 feet or more.

As noted above, the placement of artificial light sources outside of a solar tube can result in perceptible color variations between the light supplied by the artificial light source and the natural light supplied by the solar tube. While such placement is envisioned by the present disclosure, it may be desirable to control the degree of color difference between the artificial light sources and natural light sources described herein. Accordingly, in some embodiments of the present disclosure, the ambient sensor(s) 210 and control unit 211 cooperatively function to monitor and adjust the color, color temperature, and/or intensity of the light outputted by the artificial light sources, relative to the color and intensity of the light outputted from a natural light source, such as the solar tube. In this way, the lighting systems described herein can illuminate an area with a lighting profile that is substantially uniform, or which incorporates regions illuminated by light of varied color, color temperature, and/or intensity.

FIG. 2D illustrates one non-limiting example of this concept. As shown, lighting system 200 includes multiple solar tubes having a dome 201, an optical conduit 202, a diffuser 203, and a shutter 208. Artificial light sources 207, e.g., tunable LED sources, are mounted external to the solar tubes, such as to a ceiling 206 of an internal space of a building 205. Daylight sensor 209 measures the color and intensity information outside of a window 213, and transmits environmental signals containing such information to control unit 211. A plurality of ambient sensors 210 are disposed around the interior space of building 205. The plurality of ambient sensors 210 measure the color, color temperature, and intensity of the light present in the interior space of the building 205, the light emitted by the artificial light sources 207, and/or the light emitted by sources of natural light, e.g., the solar tubes and/or window 213 solar tube(s). In some embodiments, the ambient sensors are configured to measure other environmental factors such as temperature and/or humidity, either alone or in combination with the color, color temperature and intensity information described above. Such temperature and humidity data could be inputted, for example, into an HVAC control, thereby permitting control over the lighting, temperature and humidity of a controlled environment.

The daylight (environmental) sensors 209 communicate the aforementioned data in the form of environmental signals to the control unit 211. The control unit 211 analyzes the environmental signals provided by the daylight sensor 209 and the plurality of ambient sensors 210, and outputs control signals wirelessly to the shutter 208 and the plurality of artificial light sources, via receivers 215 and optional wireless repeaters 212. In response to those control signals, the shutters 208 can actuate to adjust the intensity of the natural light supplied by the solar tubes to the interior space of building 205. In addition, the color, color temperature, and/or intensity of each of the artificial light sources 207 may be adjusted. In this way, control unit 211 is capable of actively adjusting the color, temperature, quality, and intensity of the light supplied by the lighting system 200.

Based on the above description, it should be understood that the components of the lighting systems described herein may be located in a variety of different locations. Thus, for example, the sensors, solar tubes, and artificial light sources may be disposed at different locations within the same room or building. Regardless of their positioning, such components may be individually addressable and controllable by the control unit 211. Moreover, control unit 211 may be capable of sending different control signals to various parts of the lighting system (e.g., different artificial light sources, shutters, etc). As a result, control unit 211 can issue control signals that cause differing light output and shutter control at one point in the system, relative to another point in the system. Control system 211 can therefore provide significant flexibility to lighting designers with respect to altering the overall lighting environment of an interior space. Indeed, such systems can enable a lighting designer to design lighting environments that utilize light of a substantially uniform color and/or intensity, or to utilize light of varying color and/or intensity depending on location within the building, time of day, or other factors.

Figure 5:
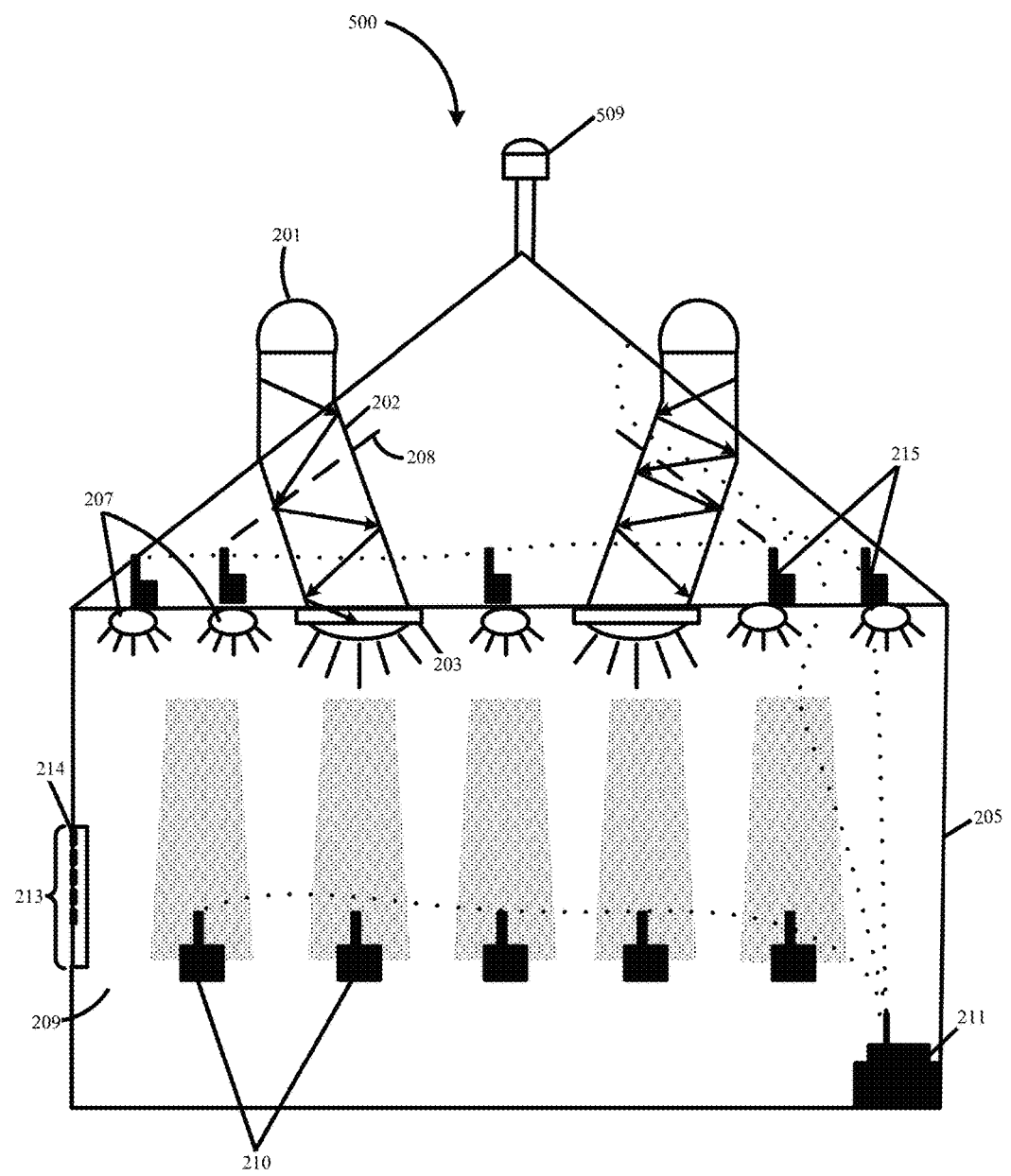
FIG. 5 graphically illustrates an exemplary lighting system including an all sky camera in accordance with the present disclosure.

As noted previously, one aspect of the present disclosure relates to lighting systems that include at least one daylight (environmental) sensor in the form of an all-sky camera. FIG. 5 depicts one-non-limiting embodiment of such a system. As shown, system 500 includes all sky camera 509. For the sake of illustration, system 500 is also depicted in FIG. 5 as including certain components of system 200, which were previously described in connection with FIGS. 2B and 2D. Thus for the sake of brevity, the nature and function of these common components is not reiterated here. While certain components (e.g., the ambient sensor 210) of system 200 are not illustrated in FIG. 5 for the purpose of clarity, it should be understood that such components may be included in system 500, and that such components function in the same manner as previously described in connection with system 200.

In FIG. 5, all sky camera 509 is positioned at the apex of the roof (not labeled) of building 205. Positioning all sky camera 509 in this manner may allow it to have an unobstructed view of the sky, as well as the lighting environment immediately surrounding building 205. Of course, such position is exemplary only, and all sky camera 509 may be placed at any suitable location. In instances where building 205 has a flat roof, for example, all sky camera 509 may be placed at any location on such roof. Alternatively or additionally, all sky camera may be positioned remotely from building 205. In any case, all sky camera 509 may be positioned such that the path of the sun will be viewable over the course of a defined time period, e.g., from about 1 to about 24 hours.

For simplicity, FIG. 5 depicts system 500 as including a single all sky camera 509. While the use of a single all sky camera are envisioned by the present disclosure, the systems described herein may include any number of all sky cameras and other daylight (environmental) sensors (e.g., daylight sensors 209).

All sky camera 509 may include optics (e.g., a fisheye lens) that allow it to provide a horizon to horizon (e.g., elevation) image of about 180°, and an azimuthal image of about 360°. In such instances, all sky camera 509 may provide information about the lighting conditions existing around all or substantially all of building 205. In instances where all sky camera 509 is a black and white camera, for example, it may measure the intensity of light around all or substantially all of building 205. Similarly, where all sky camera 509 is a color camera, it may measure the color (as well as intensity) of light around all or substantially all of building 205.

Apart from measuring color, intensity, and/or other spectral information from a wide area, the all sky camera 509 may be understood to function in much the same manner as the daylight sensor 209 in FIGS. 2B and 2D. Thus for example, all sky camera 509 may generate environmental signals for transmission to control unit 211. In response to information contained in such signals, the control unit 211 may output control signals to the artificial light sources 207 (and/or shutter 208) so as to alter the color and/or intensity of the light produced by system 500 within one or more locations in building 205.

The environmental signals from the all sky camera 509 may contain more information than environmental signals produced by a daylight sensor with a narrower field of view, e.g., daylight second 209 in FIGS. 3B and 2D. Indeed, because all sky camera 509 has a wide field of view, it may generate environmental signals that contain information about the lighting conditions existing around all or substantially all of building 205. Depending on the desired interior lighting effect, control unit 211 may be configured to analyze the data provided in the environmental signals produced by all sky camera 509, and determine the spectral characteristics of light existing at a particular location around building 205.

Figure 6A:
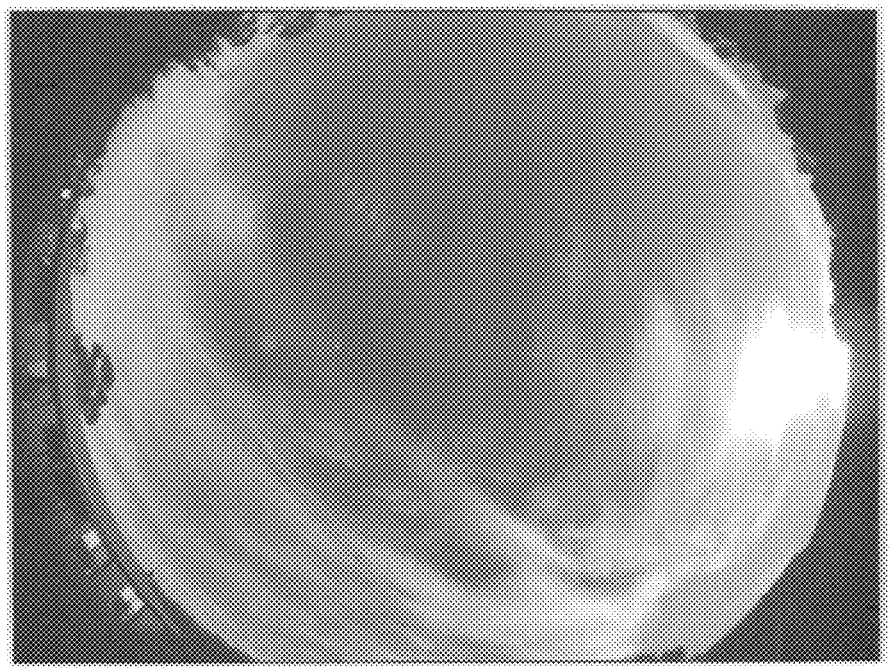
FIGS. 6A and 6B provide an exemplary image produced by an all sky camera, with and without a grid overlay.

FIG. 6A shows an exemplary daytime image taken by an all sky camera equipped with a fisheye lens. From this FIG., it is clear that the all sky camera producing this particular image has been located such that the path of the sun is within its field of view over the course of an entire day. As may be understood, an all sky camera may be configured to continuously or periodically send images similar to those shown in FIG. 6A (and/or spectral information contained therein) to control unit 211, e.g., in one or more environmental signals.

Figure 6B:
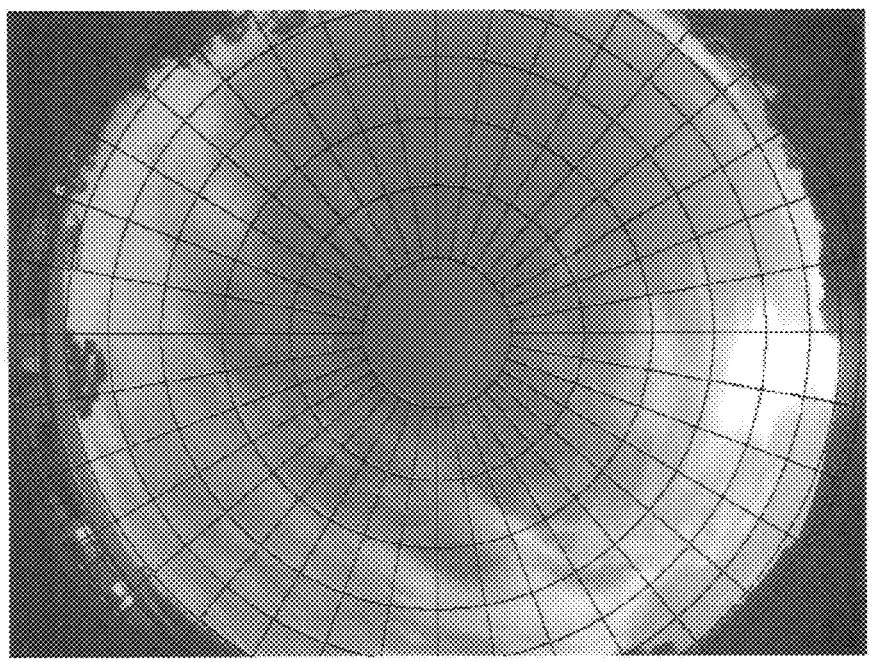

Using appropriate software (e.g., the astronomical image processing software known as IRIS), software produced using the IDL programming language by RSI, LabView, combinations thereof, and the like) control unit 211 can extract spectral and/or other information relevant to the lighting conditions from an image produced by an all sky camera. This concept is shown in FIG. 6B, wherein a control unit has superimposed a coordination grid over the image shown in FIG. 6A. Control units consistent with the present disclosure may correlate one or more individual regions of the coordination grid with locations around the all sky camera producing the image. For example, control unit 211 may associate regions within the grid to locations, fields of view, viewing angles, combinations thereof, and the like. In some embodiments, control unit 211 is configured to correlate regions of an image/coordination grid to locations, fields of view, viewing angles, combinations thereof, and the like, relative to the location of the all sky camera that produced the image under consideration.

In other non-limiting embodiments, control unit 211 is configured to correlate regions of an image/coordination grid to locations, fields of view, viewing angles, combinations thereof, and the like, relative to locations within or about a building on/in which lighting system 500 is installed. Thus for example, control unit 211 may correlate regions of an image/grid to particular rooms within building 205, with a particular directional facing (e.g., North, South, East, West, etc.) relative to building 205, and the like.

Figure 7A:
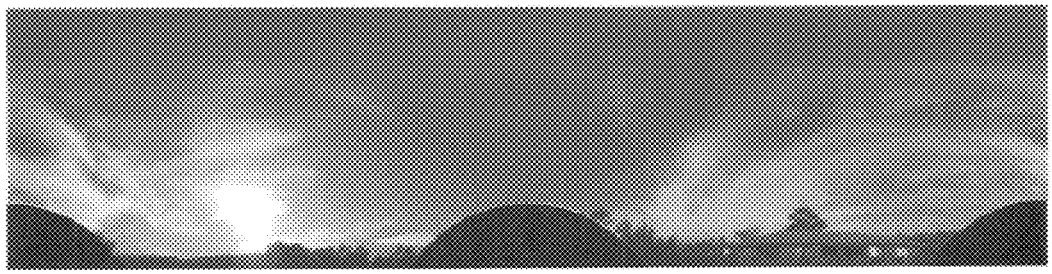
FIGS. 7A and 7B provide exemplary cylindrical projections of the images in FIGS. 6A and 6B, respectively.
Figure 7B:
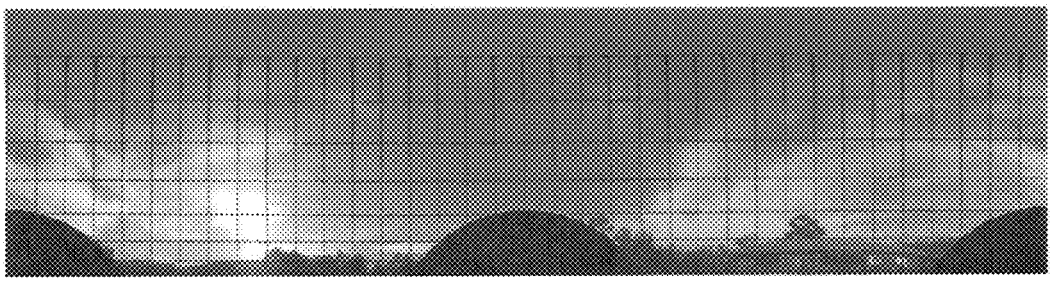

The control units described herein may be further configured to process images received from an all-sky camera into a cylindrical or panoramic projection. This concept is shown in FIGS. 7A and 7B, wherein the images provided in FIGS. 6A and 6B have been processed by a control unit into a cylindrical (or panoramic) format. Similar to the images in FIGS. 6A and 6B, the cylindrical projections in FIGS. 7A and 7B are images of the environment around an all sky camera with a horizon to horizon view of about 180°, and an azimuthal view of about 360°. Thus, if the left edge of FIG. 7A is considered to correlate to a viewing angle of about 0° relative to the all sky camera, the right edge of FIG. 7A may be considered to correlate to a viewing angle about 359° (or whatever the maximum viewing angle of the all sky camera happens to be).

If the image in FIG. 7A were cut out and bent such that its left and right edges touches, the resulting cylinder would represent the entire field of view of the all sky camera. In some instances, the use of cylindrical projections may facilitate the ability of a control unit to correlate of regions of an image with certain fields of view, directions, etc. relative to an all sky camera or building.

For example, control unit 211 may understand the left, right, top, and/or bottom edge(s) of a cylindrical projection to correlate to a particular viewing angle relative to an all sky camera. By subdividing the length of the image into segments of equal length, the control unit may accurately correlate such segments with particular azimuth and elevation angles from the all sky camera. By way of example, if an all sky camera has an azimuthal field of view of 360°, a control unit may be configured to divide a cylindrical projection provided by the camera into 360 equally spaced vertical slices. Each slice would therefore correlate to 1° of azimuthal viewing angle of the camera. The control until could similarly divide the cylindrical projection into equally spaced horizontal slices, with each slice correlating to a degree of elevation (horizon) viewing angle of the camera. This concept is shown in FIG. 7B, wherein coordination grid consists of equally spaced intersecting horizontal and vertical lines. Because each line correlates to a particular azimuth and elevation angle, the control until may accurately determine the azimuth and elevation angle for each region of the coordination grid.

In any case, control unit 211 may be configured to process images received from all sky camera 509, so as to extract relevant information that may be used to drive one or more of the artificial light sources used in system 500. For example, control unit 211 may be configured to extract color and/or intensity data from one or more images provided by all sky camera 509. In some embodiments, control unit 211 extracts color and/or intensity information from an entirety of such an image. In such instances, control unit 211 may determine an average intensity and/or an average color of an image produced by all sky camera. Alternatively or additionally, control unit 211 may extract intensity and/or color information from certain regions of such images. For example, control unit 211 may be configured to extract color and/or intensity information from regions of an image produced by all sky camera 509 that correlate to particular directional facings, viewing angles, etc. around all sky camera 509 (e.g., East, West, North, South, etc., at a desired angle of elevation). Likewise, control unit 211 may be configured to extract color and/or intensity information from regions of an image produced by all sky camera that correlate to one or more locations, fields of view, viewing angles, combinations thereof, and the like, relative to building 205 (or one or more locations therein) and/or all sky camera 509.

Because all sky camera 509 has a wide field of view, objects such as birds, planes, clouds and the like may temporarily impact observed exterior lighting conditions. Left unchecked, such temporary variations in observed exterior lighting conditions may cause undesirable variation in interior lighting produced by a lighting system. For example, if a cloud temporarily obscures the sun, all sky camera 509 and control unit 511 may observe that event as a significant change in the intensity and/or color of exterior light. Control unit 511 may then drive artificial lamps in the system at higher intensity or color than is needed.

To address this issue control unit 511 may be configured to average spectral information extracted from images provided by all sky camera 509. For example, control unit 511 may average intensity and/or color values extracted from multiple images provided by all sky camera over time, i.e., in the time domain. Likewise, control unit 511 may average intensity and/or color values of an area within an image (e.g., a pre-selected area of pixels) provided by all-sky camera 509, as opposed to simply using data extracted from a single pixel. By averaging the extracted information in the space and/or time domain, temporary fluctuations in the extracted intensity and/or color values may reduce or eliminate undesirable fluctuation in interior lighting conditions.

In any case, based on the information contained in the environmental signals produced by the all sky camera 509, control unit 211 may output control signals to the artificial light sources 207 (and/or shutter 208), so as to adjust the color and/or intensity of the light produced by the artificial light sources 207, in the same manner described above in connection with FIGS. 2B and 2D. Thus for example, control unit 211 may adjust the color and/or intensity of the light produced by artificial light sources 207, 407 so as to substantially mimic or supplement the color and/or intensity of natural light in all or a portion of the regions measured by all sky camera 509. In cases where the artificial light supplements natural light, for example, the artificial light may "fill in" or override gaps and/or undesirable variations in the spectrum of the natural light so as to achieve light of desired quality, color, and/or spectral characteristics.

Figure 8A:
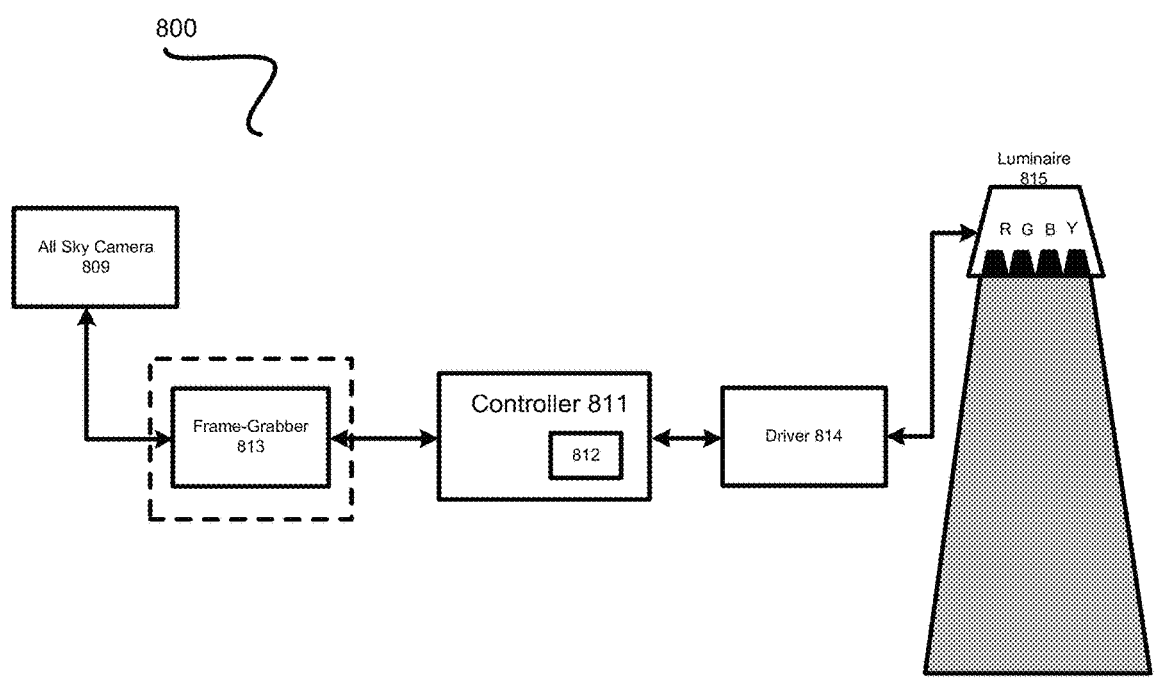
FIG. 8A is a box diagram of an exemplary lighting system including an all sky camera and a single luminaire, in accordance with the present disclosure.
Figure 8B:
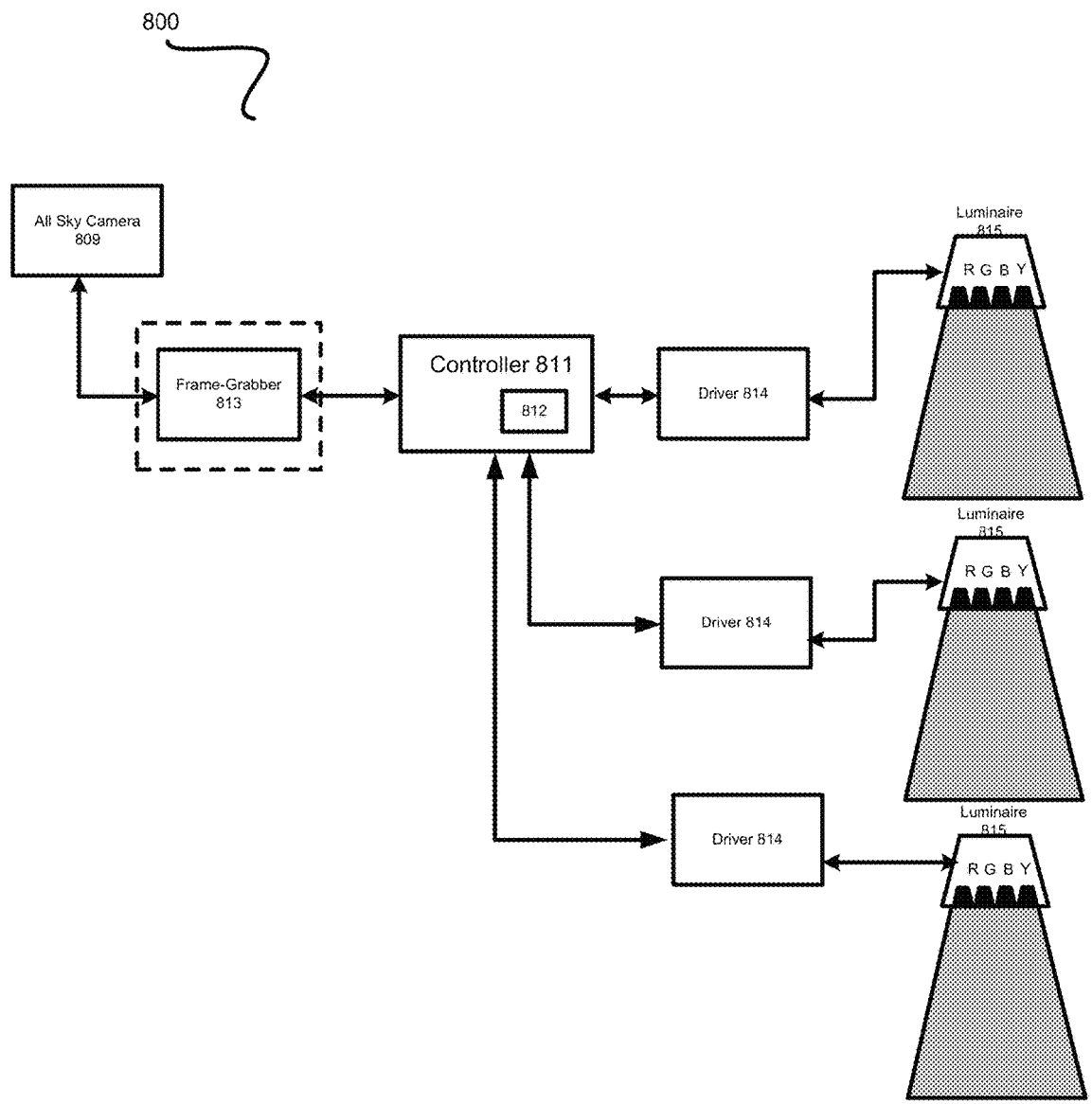
FIG. 8B is a box diagram of an exemplary lighting system including an all sky camera and multiple luminaires, in accordance with the present disclosure.

Reference is now made to FIGS. 8A and 8B, which depict two exemplary systems in accordance with the present disclosure. For the sake of clarity, FIGS. 8A and 8B have been drawn with relatively few components, so as to highlight and clarify the interaction between an all sky camera (or other environmental sensor) with a control unit to drive one or more multimode light sources. The configuration in these figures is exemplary only, and it should be understood that other components (such as those described in connection with other FIGS. may be included. It should also be understood that the systems of the present disclosure may be used independently of a natural light source, such as solar tube 201 in FIGS. 2A-2C.

As shown in FIGS. 8A and 8B, system 800 includes all sky camera 809, optional frame grabber 813, control unit 811, driver 814, and multimode light source(s) 815 (hereafter, luminaire(s) 815). In operation, all sky camera may take one or more images of its surroundings. In some embodiments, all sky camera includes a video camera that takes images of its surroundings at a frequent rate, such as from about 1 to about 30 frames per second or more. In such instances, system 800 may include an optional frame grabber 813 that selects certain "frames" of the video signal produced by all sky camera, and supplies the selected frames to control unit 811. In other non-limiting embodiments, all sky camera 809 may be in the form of a digital camera that takes single or periodic still images of its surroundings as a relatively slow rate, e.g., at about 0.1 to less than about 1 frame per second, in which case optional frame grabber may not be necessary.

Images produced by all sky camera 809 may be communicated to control unit 811, e.g., in one or more environmental signals. As described previously, control unit 811 may include a processor and a memory (not shown) having software (e.g., software 812) stored thereon. Execution of software 812 by a processor may cause control unit 811 to analyze images received from all sky camera 809, e.g., to extract intensity and or color information from such images. Controller 211 may then communicate such intensity and/or color information to driver 814, e.g., in the form of one of or more control signals. In response to such control signals, driver 814 may drive luminaire(s) 815 to produce light of a desired color and/or intensity. In this example, the luminaire(s) are in the form of a color tunable R-G-B-Y LED luminaire. Thus, driver 814 may cause the luminaire(s) 815 to emit certain quantities of red, green, blue, and or yellow light, which in combination may form light of a desired color and/or intensity.

As demonstrated above, an all sky camera may be used to provide spectral information regarding lighting conditions that exist around a building or other structure. A single all sky camera may therefore provide to a control unit all the information needed to drive a lighting system consistent with the present disclosure. In some embodiments, this can eliminate the need to use multiple daylight sensors to obtain spectral information about lighting conditions that exist around a building or other structure. Substantial monetary savings may therefore be realized by using an all sky camera instead of multiple daylight sensors. Moreover, the use of a single sensor may simplify the operation of the lighting system, streamline maintenance, and/or provide other benefits.

Use of one or more all sky cameras may also enable the performance of advanced functions that may otherwise be impracticable to execute with a system that utilizes multiple daylight sensors with a more limited field of view. As noted previously, all sky cameras have a wide field of view, and are capable of producing images capturing large regions of the sky and/or environment above/around the camera's location. This wide field of view may be leveraged to enable tracking and predictive features within a control unit for a combined lighting system.

For example, a control unit consistent may be configured to track one or more objects appearing in images produced by an all sky camera. Non-limiting examples of such objects include the sun, aircraft, birds, clouds, debris, and the like. By monitoring the position of an object over time, the control unit may determine the rate and/or direction such objects, in real time or with a delay.

In some embodiments, a control unit may be configured to track or otherwise monitor the position of the sun, relative to the position of another object, such as one or more clouds. By monitoring the position of the sun and other object over time, the control unit may determine the rate (speed) at which each object is moving, as well its direction. The control unit may use this information to calculate or predict when such objects will "collide" or overlap. In the case of the sun and a cloud, for example, the control unit may calculate or predict when the cloud will obscure the sun.

In addition to predicting when (i.e., the time) at which two objects will "collide," the control unit may be configured to determine the position of such objects at the time of collision, relative to the position of the all sky camera, a building/structure as a whole, or a particular position on or within a building or structure. In this way, the control unit may predict when changes in natural lighting conditions will occur, e.g., due to obstruction of the sun by one or more other objects, such as a cloud. Moreover, the control unit may predict the impact of such obstruction on the lighting conditions within a building/structure in which a lighting system consistent with the present disclosure is installed. As may be appreciated, the control unit may use such predictions to drive artificial lights in the system appropriately, so as to avoid sudden or otherwise undesirable changes in interior lighting conditions.

In addition, the use of an all-sky camera may enable monitoring of other exterior lighting characteristics. For example, the average intensity of light in an image produced by an all sky camera may be measured. By monitoring the average intensity over time, light pollution or even air pollution in the area surrounding the all sky camera could be monitored. Similarly, a network of all sky cameras could be used to monitor light pollution over a larger area.

Figure 4:
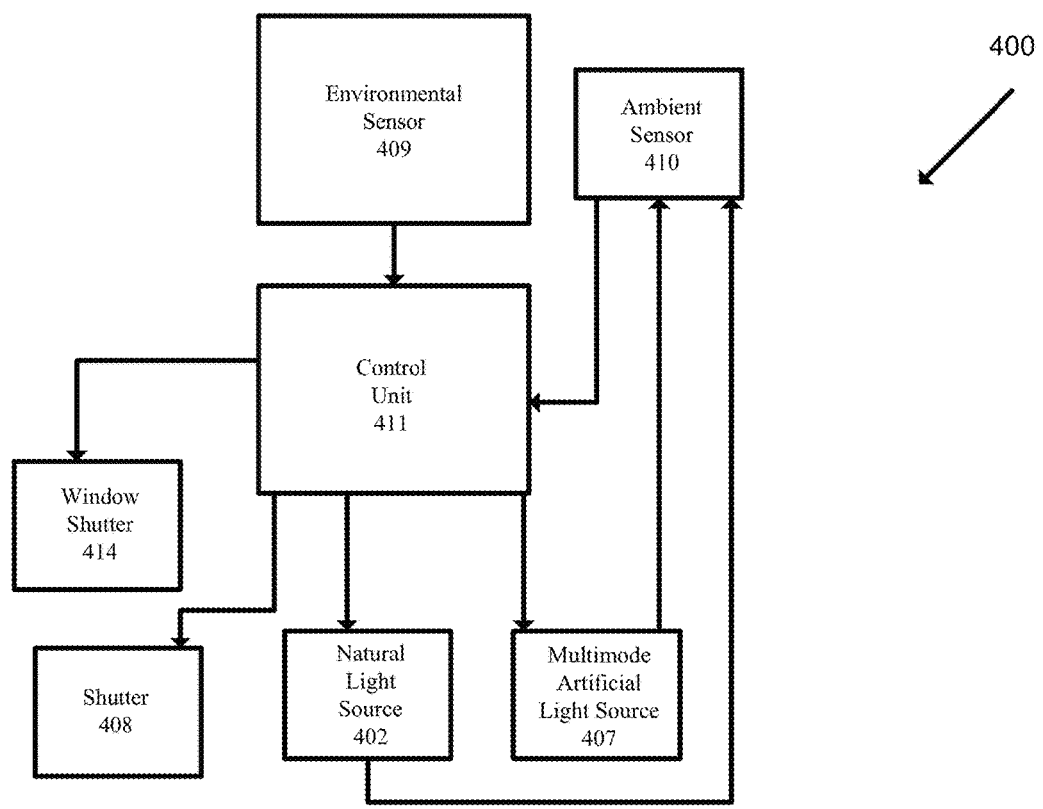
FIG. 4 is a box diagram illustrating information flow between components of an exemplary system in accordance with the present disclosure.

Another aspect of the present disclosure relates to lighting methods that utilize the lighting systems described herein. As an example of such a method, reference is made to FIG. 4, wherein arrows are utilized to illustrate the flow of information and/or signals between the components of an exemplary lighting system 400 in accordance with the present disclosure. As shown, the methods described herein include providing a lighting system 400 that includes at least one natural light source 402 (e.g., a solar tube), at least one artificial light source 407 (e.g., a multimode artificial light source), at least one environmental sensor 409, and at least one control unit 411. The natural light source 402 may also include at least one shutter 408 (not shown). At least one ambient sensor 410 and at least one window shutter 414 may also be included.

In such methods, the environmental sensor 409 (e.g., a daylight sensor) measures at least one environmental characteristic, such as the color, color temperature, and/or intensity of an outdoor environment. The environmental sensor 409 outputs environmental signals containing information regarding the at least one environmental characteristic to the control system 411. In systems that utilize an ambient sensor 410, the ambient sensor 410 measures, independently of environmental sensor 409, environmental characteristics (e.g., color, color temperature, and/or intensity) of an environment to be illuminated by the lighting system 400, as well as the light outputted by the natural light source and artificial light source 407. Based on those measurements, the ambient sensor 410 outputs environmental signals to control system 411.

Upon receiving environmental signals from the environmental sensor 409 and, optionally, the ambient sensor 410, the control system 411 outputs at least one control signal to the artificial light sources 407 and, optionally, shutter 408 and window shutter 414. In response to these control signals, the artificial light sources 407 output light of a desired color, color temperature, and/or intensity. In addition, the shutter 408 and/or the window shutter 414 may actuate to admit more or less natural light. In this way, the control system 411 can independently control the individual elements of lighting system 400, so as to achieve a desired lighting profile in an illuminated space.

The lighting systems and methods of the present disclosure have potential for substantial energy savings by enabling greater usage of natural light. In addition, such systems are capable of replicating current daylight conditions, and overriding current daylight conditions with a desired optional lighting profile, thus providing numerous choices to an end user.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A window lighting system, comprising:
   a window configured to deliver light from a natural light source to the interior of a stationary architectural structure;
   a multimode artificial light source;
   an all sky camera disposed at a predetermined position external to the interior of the architectural structure and configured to capture image data of an environment within a field of view of said all sky camera corresponding to a path of travel of the sun over the course of a preselected time period viewable from said predetermined position;
   a control unit in communication with said multimode artificial light source and said all sky camera; and
   a mixing chamber configured to receive light from said natural light source and light from said at least one multimode artificial light source and to emit mixed light into the interior of the architectural structure;
   wherein:
      said control unit is configured to, in response to an environmental control signal from said all sky camera, output at least one control signal to said multimode artificial light source; and
      said multimode artificial light source is configured to output light of varying color and color temperature in response to said at least one control signal.

2. The window lighting system of claim 1, wherein said at least one multimode artificial light source comprises at least one light emitting diode (LED).

3. The window lighting system of claim 2, wherein said at least one multimode artificial light source comprises at least one red, green, and blue LED.

4. The window lighting system of claim 1, wherein said at least one multimode artificial light source comprises a plurality of light emitting diodes (LEDS), wherein each of said plurality of LEDS is individually addressed and controlled by said at least one control unit.

5. The window lighting system of claim 1, wherein said natural light source comprises a solar tube and said mixing chamber is within said solar tube.

6. The window lighting system of claim 1, wherein said at least one multimode artificial light source is disposed within at least one solar tube.

7. The window lighting system of claim 1, wherein said environmental control signal comprises an image of the environment within a field of view of said all sky camera, and said control unit is configured to extract spectral information from said image, said spectral information being selected from the group consisting of light intensity, color, color temperature, spectral variation, and combinations thereof.

8. The window lighting system of claim 7, wherein said control unit is further configured to average said spectral information over time, space, or a combination thereof.

9. The window lighting system of claim 7, wherein said control unit is configured to correlate regions of said image to at least one location, field of view, viewing angle, or combination thereof, relative to the location of said all sky camera.

10. The window lighting system of claim 7, wherein said spectral information includes light intensity and at least one additional spectral information from said group.

11. The window lighting system of claim 1, further comprising at least one single mode artificial light source.

12. The window lighting system of claim 11, wherein the at least one single mode artificial light source comprises at least one first fluorescent lamp having a first color temperature and at least one second fluorescent lamp having a second color temperature, wherein the first color temperature differs from the second color temperature.

13. The window lighting system of claim 1, wherein said natural light source comprises a solar tube.

14. The window lighting system of claim 1, wherein said control unit is configured to:
   monitor the position of a sun and at least one object;
   predict an occlusion of said sun by said at least one object in at least one of time and space; and
   drive said multimode artificial light source to compensate for predicted variation in exterior light intensity, color variation, and combinations thereof.

15. A window lighting method, comprising:
   providing a lighting system, comprising:
      a window configured to deliver light from a natural light source to an interior of a stationay architectural structure;
      a multimode artificial light source;
      an all sky camera configured to capture image data of an environment within a field of view of said all sky camera; and
   a control unit in communication with said all sky camera and said multimode artificial light source;
   disposing said all sky camera at a predetermined position external to the interior of the architectural structure;
   measuring at least one environmental characteristic with said all sky camera with said field of view corresponding to a path of travel of the sun over the course of a preselected time period viewable from said predetermined position;
   generating at least one environmental signal based on said at least one environmental characteristic;
   outputting said at least one environmental signal from said all sky camera to said control unit;
   determining, based on said at least one environmental signal, at least one control signal with said control unit;
   outputting said at least one control signal to said multimode artificial light source;
   outputting, in response to said at least one control signal, light of varying color and color temperature from said multimode artificial light source;

mixing said natural light and said light of varying color and color temperature; and emitting said mixed light into the interior of the architectural structure.

16. The window lighting method of claim 15, wherein said at least one environmental signal comprises an image of the environment within a field of view of said all sky camera, the method further comprising extracting spectral information from said image with said control unit, said spectral information being selected from the group consisting of light intensity, color, color temperature, spectral variation, and combinations thereof.

17. The window lighting method of claim 16, wherein said control unit further comprises a memory having a first lighting profile stored therein in machine readable format; the method further comprising:

determining, with said control unit, variances in said spectral information from said first lighting profile.

18. The window lighting method of claim 16, further comprising:

outputting, in response to said at least one control signal, light of a color and color temperature from said multimode artificial light source, wherein said color and color temperature are sufficient, independently of or in combination with said natural light source, to produce light of a second lighting profile in said structure, said second lighting profile being the same or different from said first lighting profile.

19. The window lighting method of claim 16, further comprising:

averaging, with said control unit, said spectral information over time, space, or a combination thereof.

20. The window lighting method of claim 16, further comprising:

correlating, with said control unit, regions of said image to at least one location, field of view, viewing angle, or a combination thereof, relative to the location of said all sky camera.

21. The window lighting method of claim 16, further comprising:

monitoring the position of a sun and at least one object with said control unit;

predicting, with said control unit, an occlusion of said sun by said at least one object in at least one of time and space; and driving, with said control unit, said multimode artificial light source to compensate for predicted variation in exterior light intensity, color variation, and combinations thereof.

22. The window lighting method of claim 16, wherein said spectral information includes light intensity and at least one additional spectral information from said group.

* * * * *